Aug. 30, 1955
D. D. PETTIGREW ET AL
FLUID OPERATED POWER APPARATUS AND
CONTROL MECHANISMS THEREFOR
2,716,395
Filed Aug. 22, 1951
2 Sheets-Sheet 1
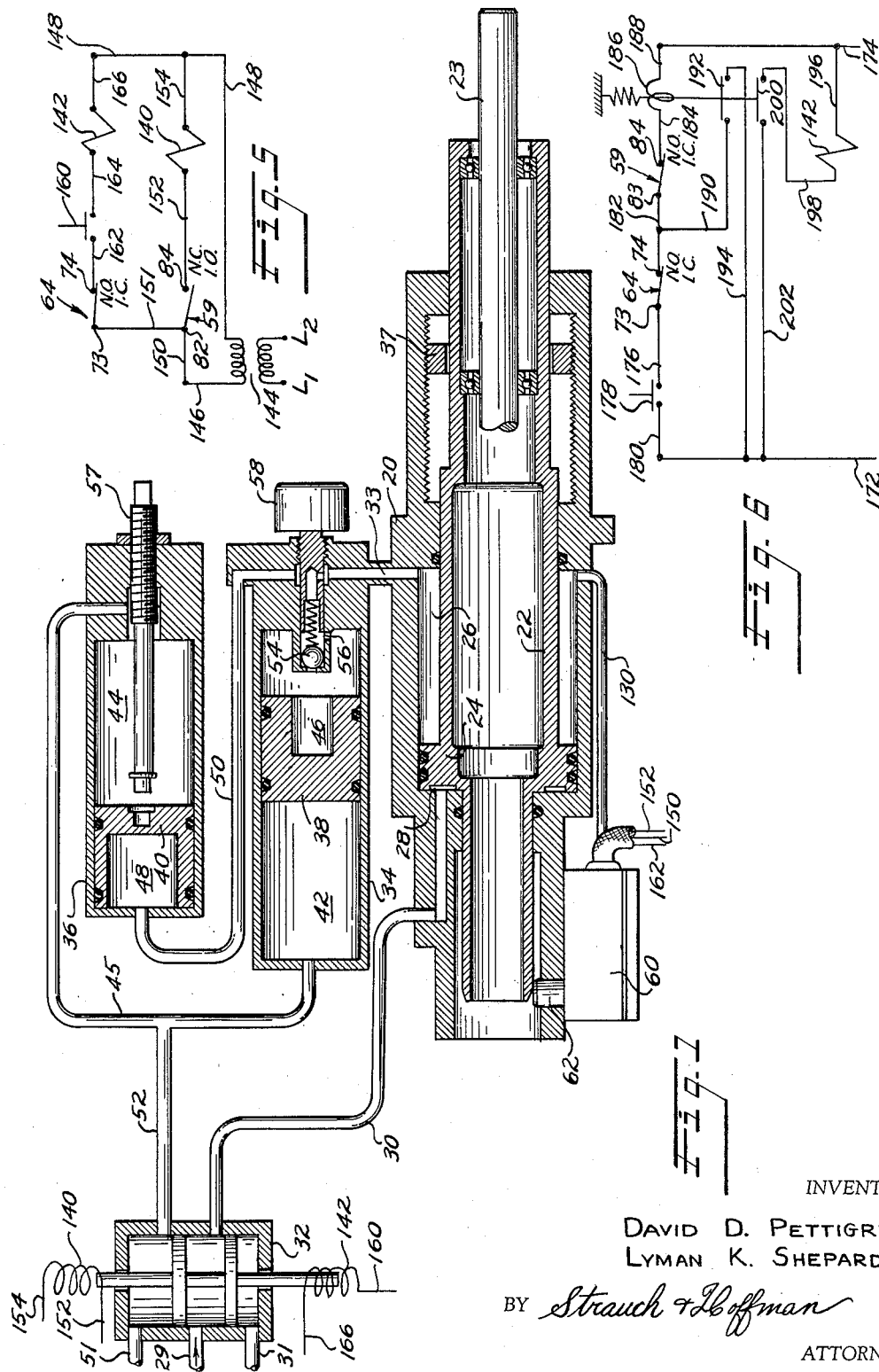
INVENTORS
DAVID D. PETTIGREW
LYMAN K. SHEPARD
BY Strauch & Hoffman
ATTORNEYS

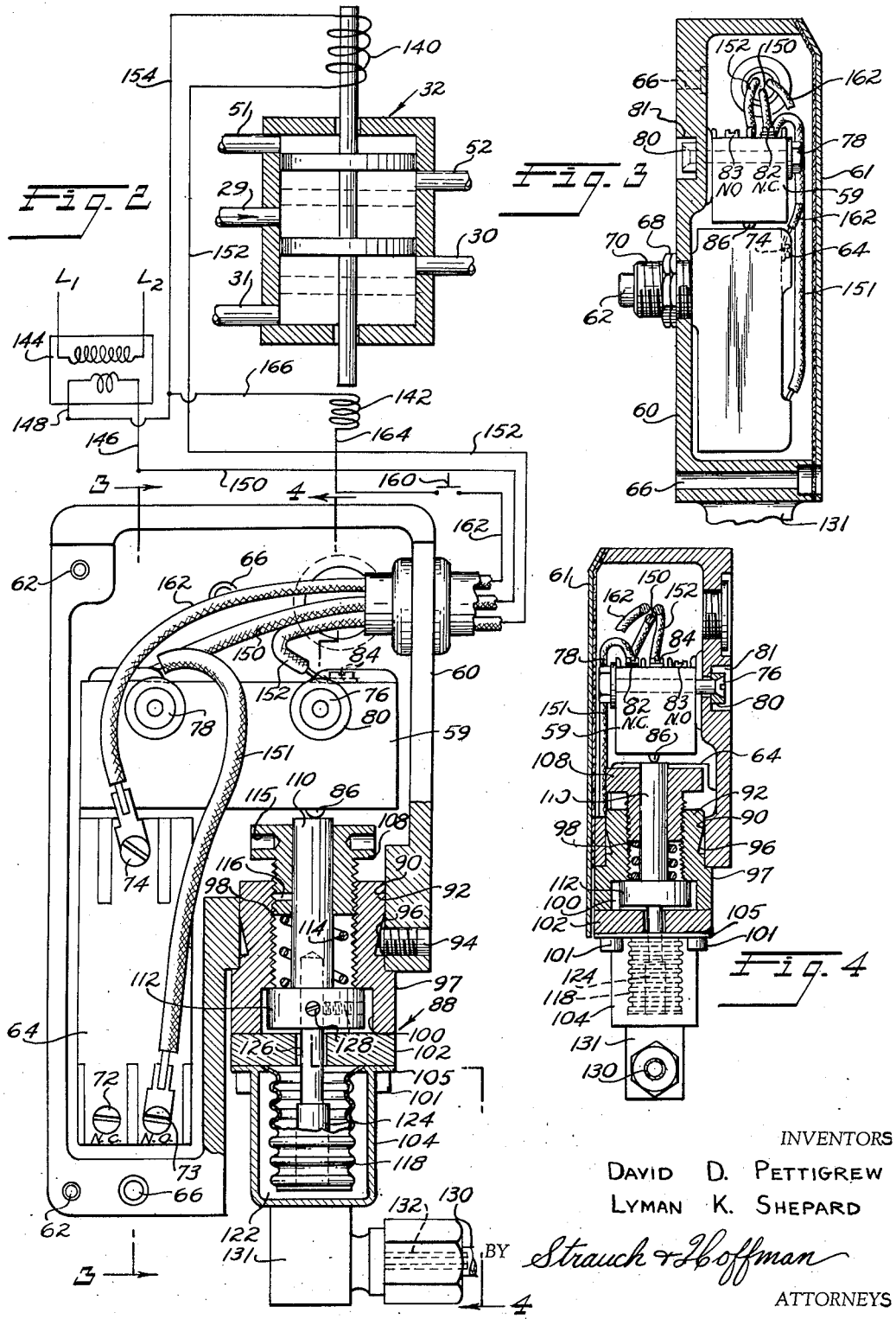

United States Patent Office

2,716,395
Patented Aug. 30, 1955

2,716,395

FLUID OPERATED POWER APPARATUS AND CONTROL MECHANISMS THEREFOR

David D. Pettigrew, Granville, and Lyman K. Shepard, Whitefish Bay, Wis., assignors, by mesne assignments, to The Hartford Special Machinery Company, Hartford, Conn., a corporation of Connecticut Application August 22, 1951, Serial No. 243,088

19 Claims. (Cl. 121—45)

This invention relates to electrical apparatus for controlling the movements of a hydro-pneumatic mechanism for example of the type disclosed in application Serial No. 161,711 filed May 12, 1950.

It has been found that in an apparatus of this type, the desired cycling control may be effectively and easily achieved by the utilization of electrical switch mechanism actuated by pressure variations in selected points in the fluid system and additional electrical switch mechanism mechanically actuated by movement of the power element of the apparatus.

Since apparatus of this kind is required for use primarily in quantity precision production and is operated at relatively high speed over extended periods of time the electrical apparatus must satisfy a number of exacting requirements.

For example, it must be extremely rugged and be capable of trouble free operation for extended periods of time, it must be sensitive in order to permit close control for precision work and it must, of course, be inexpensive.

It is, accordingly, the primary purpose and object of the present invention to provide improved electrical control apparatus for hydro-pneumatic mechanisms which satisfies each of the above requirements.

It is an additional object of the invention to provide electrical control apparatus for a hydro-pneumatic mechanism which may be automatically, semi-automatically or manually operated and is capable of ready and precise adjustment to provide the necessary variation in the character of the cycle of the mechanism to which it is applied.

It is also an object to provide improved switch mechanisms and control systems for drill units by which their operation can be controlled in conjunction with the operation of the devices, such as chucks, indexing mechanisms and the like or in conjunction with other drill units.

It is an additional object to provide novel control apparatus for a power mechanism in which the interval between the end of the forward stroke of the power element and its return stroke may be readily and accurately controlled.

It is a more specific object of the present invention to provide control circuit switch assemblies which are enclosed in a compact unitary housing which may be employed in installations where space is at a premium.

In the accomplishment of these objects there is provided in accordance with the present invention a novel assembly of a plurality of switch assemblies, one of the switches being actuated by a pressure responsive bellows.

It is an additional object to provide a novel means for actuating a limit switch by means of a fluid operated bellows.

It is also an object of the present invention to provide an improved means for mounting and controlling the movement of the bellows to protect the bellows from excessive pressure variations and materially increase its life under normal operating conditions.

Further objects and advantages will become apparent as the description proceeds in connection with the accompanying drawings in which:

Figure 1 is a diagrammatic view in partial section of a hydro-pneumatic mechanism of the type to which the present invention may be readily applied, illustrating the electrical control apparatus in place thereon;

Figure 2 is an enlarged view of the switch assembly with the cover removed and one embodiment of a control circuit with portions of the switch assembly broken away to show interior details;

Figures 3 and 4 are reduced transverse sectional views taken along lines 3—3 and 4—4 respectively, of Figure 2;

Figure 5 is a circuit diagram illustrating the complete circuit shown in Figure 2 and incorporating the switch of Figures 2, 3 and 4 for controlling the apparatus in Figure 1; and Figure 6 is a view similar to Figure 5 illustrating a modified control circuit.

Referring now more particularly to the drawings, Figure 1 illustrates, in simplified form, a power feed hydro-pneumatic mechanism of the type disclosed in the aforesaid copending application to which the control systems and switch assemblies of the present invention have particular application.

The details of the power mechanism illustrated in Figure 1 form no part of the present invention and accordingly will be described only insofar as is necessary to explain the function and application of the novel control apparatus.

With continuing reference to Figure 1, 20 indicates a main power cylinder in which a power piston 22, rotatably carrying a drill spindle 23, is reciprocably received. The enlarged annular portion 24 of the power piston divides the main chamber within the cylinder 20 into an hydraulic chamber 26 at the forward side thereof and an air chamber 28 at its rearward side. The power piston 22 is moved to the right as viewed in Figure 1 by the application of air pressure to the chamber 28 through a conduit 30 which is selectively connected to pressure conduit 29 or exhaust conduit 31 through a four way valve 32 as more fully explained hereinafter. The speed of the piston 22 on its forward stroke and its reversing movement are controlled by the flow of hydraulic fluid through passage 33 which communicates with a control section comprising a feed cylinder 34 and a rapid approach cylinder 36. Forward movement of the piston 22 is limited by adjustable stop collar 37 threaded into the forward end of cylinder body 20.

Reciprocably received within the cylinders 34 and 36, respectively, are a feed piston 38 and a rapid approach piston 40 which divide the respective cylinders into air chambers 42 and 44, respectively, interconnected through conduit 45 and hydraulic chambers 46 and 48, the latter being interconnected through conduit 50. The air chambers 42 and 44 are in communication selectively with pressure conduit 29 and exhaust conduit 51 through the four way valve 32 and a conduit 52. It will be seen that communication is established directly from passage 33 to the chamber 48 through the conduit 50 and is established to the chamber 46 through a one way ball check valve 54 and an orifice 56, the effective size of which is controlled by the mechanism indicated generally at 58. The movement of rapid approach piston 40 to the right is limited by an adjustable abutment 57.

The operation of the mechanism thus far described is briefly as follows:

Assuming the pistons 22, 38 and 40 are in the position shown in Figure 1 and that conduit 30 is connected to pressure conduit 29 while conduit 52 is connected to exhaust conduit 51, air pressure will be applied to chamber 28, move the piston 22 to the right forcing hydraulic fluid out of chamber 26 through passage 33. Since the space 44 is vented, hydraulic fluid passes freely through passages 33 and 50 into chamber 48 forcing the rapid approach piston 40 rapidly to the right until it abuts against the end of the movable stop 57. It will be seen that after the rapid approach piston 40 reaches the limit of its stroke, fluid expelled from passage 33 may pass only through the metering orifice 56 since the ball check 54 is held in its closed position. The piston 22 will then continue to advance to the right at a reduced rate determined by the setting of the mechanism 58. During this portion of the stroke, piston 38 will move freely to the left since chamber 42 is vented. Movement of the piston 22 to the right at the reduced rate will continue until the piston abuts the movable stop 37. When piston 22 stops pressure quickly falls off in chamber 26 and a pressure responsive switch 59 (Figures 2 and 3) in housing 60, attached to the side of the cylinder body 20, is actuated to shift the valve 32 as more fully explained hereinafter.

When the valve 32 is shifted, the conduit 52 is connected to the pressure conduit 29 and the conduit 30 is connected to exhaust conduit 31, thus venting the chamber 28 and connecting the chambers 42 and 44 to pressure. Thus, the rapid approach piston 40 will be moved to the left and the feed piston 38 will be moved to the right, both pistons being effective to force fluid through passage 33 into the chamber 26, moving piston 22 rapidly to the left. Movement of the piston to the left continues until the rear end of the piston 22 contacts a plunger 62 to actuate a second switch mechanism 64 in housing 60 to ready the mechanism for the initiation of the next cycle of operation.

Referring now more particularly to Figures 2, 3 and 4 in which the construction of the switch assemblies and the switch housing 60 are shown in detail, it will be seen that the switch housing 60 is of unitary cast hollow construction having an open top to which a cover plate 61 may be attached by cap screws threaded into tapped openings 62. A plurality of bores 66 are provided in the bottom of the housing 60 which receive suitable bolts, not shown, for attaching housing 60 to the main cylinder body 20. The mechanically actuated switch 64 is held in position within the housing 60 by means of lock nuts 68 threaded on an integral extension 70 of the switch 64 which extends through an aperture in the bottom of the switch housing 60 as seen in Figure 3. The actuating plunger 62 is reciprocably received within extension 70. The switch 64, which is a commercially available limit switch, is provided with three terminals 72, 73 and 74 by which the switch 64 may be connected to a control circuit. When the terminals 72 and 74 are used, the switch 64 acts as a normally closed switch and depression of plunger 62 will open the switch. On the other hand, when the terminals 73 and 74 are used, as is the case in Figures 2, 5, and 6, the switch 64 acts as a normally open switch and depression of the plunger will close the switch. It will be understood that the plunger is spring biased to its extended position.

The switch 59 is a similar commercially available limit switch and is mounted in housing 60 by means of screws 76 and nuts 78. It will be noted that the heads of screws 67 are received in a spacer bar 80 which extends across the bottom of the housing 60 and is received in a slot 81 therein to preserve the smooth contour of the base of the housing 60 and allow flush contact with the cylinder body 20. The spacer bar 80 also permits limited vertical adjustment of switch 59 and facilitates the removal of the switch without loss of screws.

The switch 59 is provided with three terminals 82, 83 and 84 and is actuated by upward movement of pin 86, which is spring biased in its downward or extended position. When the terminals 82 and 84 are used, as is the case in Figures 2 and 5, the switch acts as a normally closed switch and upward movement of the pin 86 will open the switch. If on the other hand, the terminals 83 and 84 are used, as is the case in Figure 6, the switch acts as a normally open switch and upward movement of the pin 86 will close the switch.

As stated above, the switch 59 is actuated by a pressure responsive assembly indicated generally at 88 which will now be described with particular reference to Figures 2 and 4. As there shown, the housing 60 is provided with a bore 90 within which is received a sleeve 92. The sleeve 92 is held in place by a set screw 94 which extends through the side of housing 60 into a tapered recess 96 in the sleeve 92. When the set screw 94 is tightened the enlarged portion 97 of the sleeve 92 will be drawn tightly against the end face surrounding bore 90 and held in a predetermined axial position within bore 90 determined by the mating machine finished surfaces on the sleeve and the end of bore 90. If necessary or desired shims may be interposed at this point to obtain the desired axial positioning of the sleeve.

The sleeve 92 is provided with a threaded longitudinal bore 98 which terminates at its lower end in an enlarged counterbore 100. Attached to the lower end face of the enlarged portion 97 of sleeve 92 by means of bolts 101 are a spacer plate 102 and a bellows shell 104 having a mounting flange 105. Threaded into the bore 98 is an adjusting screw 108 which has a through bore in which a plunger 110 is reciprocably received. An enlarged section 112 of the plunger is confined between the finished bottom surface of the counterbore 100 and the opposed surface of the spacer block 102, the space between these two opposed surfaces being a few thousandths of an inch greater than the axial dimension of the enlarged section 112 of the plunger.

A compression spring 114 is coiled around the plunger and is compressed between the screw 108 and the enlarged section 112 of the plunger. The compressive force of spring 114 may be adjusted by movement of the screw 108 which is preferably provided with wrench engaging sockets 115 for this purpose. The screw 108 is slotted as at 116, the portion of the threads below the slot being upset slightly so that the screw will be frictionally locked in its adjusted position.

Received within the bellows shell 104 is a bellows unit 118 which is sealingly secured to the shell 104 adjacent its open end to form a sealed chamber 122 between the bellows and the shell. Rigidly secured to the inside of the head of the bellows 118 is a pin 124 which passes through a bore 126 in the spacer block 102 and is freely reciprocably received therein. The outer end of the pin 124 extends into a central bore in the plunger 110 and is held against relative axial movement therein by a plurality of set screws 128.

The chamber 122 is connected with hydraulic chamber 26 at the forward side of piston portion 24 through a conduit 130 and coupling attachment 131. To prevent the passage of shock waves from the chamber 26 into chamber 122 the conduit 130 or coupling 131 is preferably provided with a reduced or restricted bleed port 132. It will be seen that an increase in pressure in the chamber 26 produces a corresponding increase in the hydraulic pressure in the chamber 122 which will cause an upward movement of the free end of the bellows, moving pin 124 and plunger 110 upwardly to move pin 86 and actuate switch 59. When the pressure in chambers 26 and 122 is reduced the spring 114 will return the components to their lower position.

In the embodiment shown in Figures 1, 2, and 5 the air valve 32 is controlled by opposed momentary contact solenoids 140 and 142. A control circuit incorporating the switches 59 and 64 for actuating the solenoids 140 and 142 to operate the hydro-pneumatic mechanism of Figure 1 through a power cycle will now be described.

Power is supplied from main power leads $L_1$ and $L_2$ through a transformer 144 to secondary power leads 146 and 148. The terminal 82 of switch 59 is connected through a conductor 150 to lead 146 and is also connected to the terminal 73 of switch 64 through conductor 151. Terminal 84 of switch 59 is connected through conductor 152, solenoid 140 and conductor 154 to the power lead 148. Terminal 74 of switch 64 is connected to a normally open manual start switch 160 through conductor 162 and thence to power lead 148 through conductor 164, solenoid 142 and conductor 166. It will be noted that by the use of terminals 73 and 74 in switch 64 and terminals 82 and 84 in switch 59 the switch 64 is wired for normally open operation while the switch 59 is wired for normally closed operation.

So wired the switch 59 will close when the oil pressure in chambers 26 and 122 drops and will be opened when the oil pressure in these chambers exceeds a predetermined value either because of the restricted flow through passage 33 when air pressure is acting on piston 22 or when air pressure is applied to chambers 42 and 44 and the piston occupies its fully retracted position. The switch 64 will be closed when plunger 62 is depressed and opened when it is released.

The operation of the control system of Figure 5 is as follows:

At the start of the cycle the valve 32 will normally occupy the position shown in full lines in Figure 2, supplying air to chambers 44 and 42 and the circuit will be as illustrated in Figure 5. Thus, at the start of the cycle the piston 22 will be fully retracted and the oil in chamber 26 will be under pressure. Since the chamber 122 is under pressure and the switch 59 is wired for normally closed operation, the switch 59 is initially open. Since the piston 22 occupies its fully retracted position, the actuating plunger 62 of switch 64 will be depressed and the switch 64 will be closed. Thus, when the start switch 160 is closed, a circuit will be completed between the leads 146 and 148 through switch 64, start switch 160 and solenoid 142. When the solenoid 142 is energized the valve 32 is shuttled to the dotted line position of Figure 2 or the position of Figure 1 supplying air pressure to chamber 28 through conduit 30 and connecting the conduit 52 to exhaust venting chambers 42 and 44. The power piston then initially moves to the right through a rapid advance stroke in the manner previously explained. At this time pressure of the hydraulic fluid is assuredly above the predetermined pressure because of the restricted flow through passage 33 and the work being done in moving piston 40. Pressure is maintained on the hydraulic fluid after piston 40 abuts stop 57, since, as previously explained, the flow of fluid is thereafter through orifice 56 which acts together with the restricting influence of passage 33 to produce a reduced rate feed stroke. Thus the pressure on bellows 118 holds limit switch 59 open at all times when piston 22 is moving through its advance stroke and the following feed stroke.

Although, when the piston 22 has moved to the right a short distance, the plunger 62 is released and the switch 64 is opened and solenoid 142 is deenergized, the valve remains in its selected position and continues to supply compressed air to the chamber 28 until the opposite solenoid is energized, since a positive force is required to move it in either direction because of the counterbalancing effect of the opposed piston faces exposed to air pressure. The piston 22 will normally move continuously through its advance until it abuts against the adjustable stop 37. When this occurs the oil pressure in chambers 26 and 122 drops removing pressure from bellows 18 and permitting limit switch 59 to close since plunger 110 is withdrawn from contact with pin 86 due to the influence of spring 114. When the switch 59 closes, a circuit is completed from lead 146 to lead 148 through the switch 59 and the solenoid 140 which shuttles the valve 32 to the full line position of Figure 2 supplying compressed air to chambers 44 and 42 and venting chamber 28. This same action will take place if an abnormal drilling condition arises to unduly resist cutting of the drill since the work piece will function in the same manner as stop 37. This constitutes an important safeguard preventing damage to the tool.

With this alternate circuit energized the piston 22 is retracted rapidly in the manner previously described since free flow from chambers 46 and 48 through passages 50, the passage of ball check 54, orifice 56 and passage 33 results. During the return stroke of piston 22, the hydraulic circuit is under sufficient pressure to open switch 59. When the piston reaches its fully retracted or initial starting position, the limit switch 64 will be again closed, since the plunger 62 will be depressed by contact with the rearward end of the piston 22, and the pressure in the hydraulic circuit will hold switch 59 open. The system will now be ready for the initiation of a succeeding cycle by closing the start switch 160.

In some installations it may be desirable to employ a modified control apparatus to permit the utilization of an air valve operated by a single solenoid. A control circuit for operating the air valve 32 by means of a single solenoid in which the valve is shuttled to its upward or full line position of Figure 2 by a tension spring, not shown, is illustrated in Figure 6. As stated above, the switches 59 and 64 may be wired for either normally open or normally closed operation. In the circuit of Figure 6 both switches are connected to act as normally open switches, terminal 73 of switch 64 being connected through lead 176, start switch 178 and lead 180 to power lead 172, and terminal 74 of switch 64 being connected through a lead 182 to terminal 83 of switch 59, the opposite terminal 84 of which is connected through a lead 184, a control relay 186 and lead 188 to the other power lead 174. The terminals 74 and 83 of the respective switches are also connected to power lead 172 through lead 190, normally open contactor 192, and lead 194. One end of the valve actuating solenoid 142 is connected to the power lead 174 through a lead 196. The opposite side of solenoid 142 is connected through lead 198, normally open contactor 200, and lead 202 to the other power lead 172. The operation of the circuit of Figure 6 is as follows:

Assuming the valve 32 spring biased to the position shown in full lines in Figure 2 with air pressure being supplied to chambers 42 and 44 and the piston 22 fully retracted as shown in Figure 1, the switch 64, having been wired for normally open operation, is closed by the depression of plunger 62. Since, as described above, the oil in chamber 26 and 122 is under pressure, the switch 59, which is also wired for normally open operation, is closed by compression of the bellows 118. To initiate a power stroke the start switch 178 is closed, thus completing the circuit through the start switch, the switches 64 and 59 and the control relay 186. The energization of the control relay 186 closes contacts 192 and 200. When the contactor 192 is closed, the start switch 178 and the limit switch 64 are both shunted out of the circuit. It will be seen that when the contactor 200 is closed, a circuit is also completed between the power leads 174 and 172 through the contactor 200 and the solenoid 142, shuttling valve 32 to the dotted line position of Figure 2 and supplying air to the chamber 28 and simultaneously venting chambers 42 and 44. The piston 22 thus moves to the right in the manner previously explained. After its initial movement, the plunger 62 is released permitting switch 64 to open. However, since this switch is shunted out of the circuit, the control relay 186 continues to be energized. The movement of the piston 22 to the right continues until the piston abuts the stop 37 at which time the oil pressure in chamber 26 and in chamber 122 drops off. The bellows 118 is thus allowed to expand under the influence of spring 114 and the switch 59 is opened. The circuit through the control relay 186 is thus broken and contactors 192 and 200 are opened. The opening of contact 200 de-energizes the solenoid 142 and valve 32 returns to its initial full line position under the influence of the valve spring, supplying air to chambers 42 and 44 and venting chamber 28. The piston 22 is rapidly moved to the left until it reaches its fully retracted position at which time the plunger 62 is again depressed closing switch 64 and the pressure in chambers 22 and 126 is again established to close switch 59. The apparatus is then in readiness for the initiation of a succeeding cycle by depression of the starter button 178.

It will be apparent that the control system in either form may be made fully automatic by the substitution of a two position switch for the momentary contact start switches 160 and 178. If this substitution is made, the power piston may be automatically operated through any number of advance and return strokes.

It will be noted that in either of the control systems, a retraction of the power piston 22 is initiated by the switch 59 in response to a drop in the pressure in chamber 26. The pressure in chamber 26 during the rapid advance and feed strokes will be proportional to the pressure of the air in chamber 28. The rate at which the pressure in chamber 26 drops after the piston 22 abuts against the movable stop member 37 depends on the size of the orifice 56 and other mechanical factors. It will be apparent that, in the absence of a compensating element, such as spring 114, the actuation of the switch 59 after the piston 22 abuts stop 37 will be effected as soon as the inherent resiliency of the bellows overcomes the oil pressure in the chamber 122. Thus, if a pressure of twenty pounds per square inch is required to compress the bellows and actuate the switch, at any pressure less than twenty pounds per square inch the bellows will be relaxed, and the switch will be in its normal position. In a specific instance, if the air system pressure is such that the oil pressure in chamber 26 is a hundred pounds per square inch during the feed stroke of the piston 22 to the right, the pressure in the chamber 26 must drop from a hundred pounds per square inch to twenty pounds per square inch before the switch 59 is actuated to signal a withdrawal of the piston. Because of the relaxation of the sealing O rings and other mechanical factors, the drop of pressure is not instantaneous and, accordingly, the piston is not instantaneously returned after reaching its stop position. The length of time consumed between the interruption of the forward advance of the piston and the initiation of its return stroke is known as "the dwell time." In many machine operations, it is of considerable importance that the length of the dwell time be controlled within precise limits. It is a feature of the present invention that provision is made for easy and precise control of the dwell time.

Returning now to Figure 2 it will be seen that as the screw 108 is screwed into the bore 98, the spring 114 will be preloaded thereby urging plunger 110 and the free end of the bellows in a downward direction to supplement the inherent resiliency of the bellows. If the screw 108 is screwed out of the bore 98 the effect of the spring 114 will of course be progressively decreased.

If, for example, the tension screw 108 is adjusted so that the spring 114 exerts a force equivalent to ten pounds per square inch against the plunger 110 and the inherent resiliency of the bellows will neutralize the bellows under a force of twenty pounds per square inch, it will be seen that a pressure of thirty pounds per square inch in chamber 122 is necessary to compress the bellows to actuate switch 59. Therefore, when the pressure in the chamber 26 and 122 drops to thirty pounds per square inch the spring 114 and the inherent resiliency in the bellows 118 will cause the bellows to relax allowing the switch 59 to open. Thus, it will be apparent that the pressure at which the switch 59 is actuated can be readily varied by adjusting the compression of spring 114. It will be apparent also that it takes less time for the pressure in chamber 26 to drop from a hundred pounds per square inch to thirty pounds per square inch than it does to drop from a hundred pounds per square inch to twenty pounds per square inch. Therefore, the pressure at which the switch 59 is actuated determines the dwell time and the dwell time may accordingly be accurately controlled by adjustment of the screw 108.

After a great many cycles of operation the bellows 118 tends to lose some of its natural resiliency. As explained above, this will affect the pressure at which the switch 59 will be actuated. To compensate for any loss in resiliency in the bellows, the pressure of spring 114 may be increased by adjustment of the screw 108. Thus it will be seen that it is not necessary to discard a bellows merely because it has lost some of its inherent resiliency since this loss may be readily compensated for by adjustment of the screw 108. Thus the spring 114 and the tension screw 108 may be adjusted to prolong the useful life of the bellows 118 as well as to vary the pressure at which the switch 59 is actuated.

Since the bellows 118 is the only point in the system at which failure is likely to occur even after thousands of cycles, further precautions are taken to materially extend the useful life of the bellows.

For example, it has been found that the useful life of the bellows varies inversely with the amplitude of its movement in each operating cycle. It is a feature of the present invention that the length of stroke of the pin 124 and plunger 110 and, accordingly, the length of movement of the free end of the bellows 118 is positively limited in both directions, the total amount of movement of these parts being in the neighborhood of a few thousandths of an inch, which is sufficient to actuate a limit switch. Since the pin 124 and the plunger 110 reciprocate as a unit because of the positive connection between the elements effected by the set screws 128, the range of movement of the pin 124 and the free end of the bellows is limited by the range of movement of the plunger 110. As stated above, the movement of the plunger 110 in one direction is limited by contact of the enlarged portion of the plunger with the bottom of the bore 100. Movement of the plunger 110 in the other direction is limited by contact of the enlarged portion of the plunger with the opposed face of the spacer block 102. Therefore, despite the presence of excessive pressures in the chamber 122 responsive movement of the free end of the bellows in excess of a few thousandths of an inch is effectively prevented. On the other hand, opposite movement of the free end of the bellows is also restricted against excessive movement which might result from formation of a vacuum in chamber 122, which may actually exist under some operating conditions of the hydro-pneumatic mechanism, for example, when the mechanism is adjusted so that the piston 22 abuts stop 37 before piston 40 abuts stop 57. Under such conditions, the inertia of piston 40 tends to create a vacuum in chambers 22 and 122. By actual tests it has been determined that this restriction of the movement of the free end of the bellows at least doubles the effective life of the bellows.

As a further protection against damage to the bellows, the pressure conduit 130 interconnecting chambers 26 and 122 is as mentioned above provided with a bleed passage 132 which effectively prevents the transmission of shock waves of dangerous amplitude into chamber 122. Despite the valve of such a fluid passage, it cannot be incorporated in the prior known pressure switch mechanisms because it restricts the amount of fluid which may flow freely and instantaneously into the chamber 122 below that needed in prior devices to produce actuation of the switch element. However, in the present apparatus because of limitation of the stroke of the actuating pin and the bellows, such a restriction has a negligible effect on the switch operation although it materially increases the bellows life.

From the foregoing it will be apparent that the present invention has provided a compact unitary switch assembly and control system which is highly effective, simple in design and positive in operation. Further it will be seen that the control apparatus is characterized by an extreme sensitivity and a wide range of adjustability to change the character of the stroke and to regulate the dwell time of the controlled apparatus as desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power mechanism comprising a power piston movable through an advance and retract stroke under the control of a closed hydraulic circuit, the pressure in said circuit dropping when said advance stroke is interrupted, a valve selectively operable to supply fluid to said mechanism to advance and retract said power piston, an electrical control circuit including a solenoid for actuating said valve, a switch assembly for said control circuit comprising, a housing adapted to be secured to said power mechanism; a pair of independent switches mounted in said housing; an actuating plunger for one of said switches extending through the wall of said housing and said power mechanism into the path of a portion of said piston to be actuated upon contact with said piston portion to condition the control circuit to position said valve to advance said power piston; and a pressure responsive actuating mechanism for the other of said switches connected to the hydraulic circuit of said power mechanism to be actuated by a pressure drop of predetermined magnitude therein to condition said electrical control circuit to position said valve to retract said power piston.

2. A hydro-pneumatic power mechanism comprising a power piston movable through an advance and retract stroke under the control of a closed hydraulic circuit, a valve selectively operable to supply fluid to said mechanism to advance and retract said power piston, an electrical control circuit including a solenoid for actuating said valve, a switch assembly in said control circuit comprising, a housing adapted to be secured to said hydro-pneumatic mechanism; a first control switch in said housing; an actuating plunger for said switch extending through the wall of said housing and into said hydro-pneumatic mechanism into the path of a portion of said piston to be actuated thereby to condition said control circuit to position said valve to advance said piston; a second control switch mounted in said housing; and a pressure responsive actuating assembly for said second switch comprising, an actuating plunger, means mounting said plunger for movement toward and away from said second switch, resilient means urging said plunger away from said switch, a movable wall expansible chamber communicating with the hydraulic circuit of said hydro-pneumatic mechanism, means connecting one end of said plunger to said movable wall and cooperating means on said plunger and said housing for limiting the extent of movement of said plunger and said movable wall in both directions.

3. A hydro-pneumatic power mechanism comprising a power piston movable through an advance and a retract stroke under the control of a closed hydraulic circuit, a valve selectively operable to supply fluid to said mechanism to advance and retract said power piston, a control circuit including a solenoid for actuating said valve; a switch assembly in said control circuit comprising, a housing adapted to be secured to said power mechanism; a pair of control switches mounted in said housing, one of said switches being adapted to condition said control circuit to position said valve to advance said power piston and the other of said switches being adapted to energize said electrical control circuit to position said valve to retract said piston; an actuating plunger for said one of said switches extending through the wall of said housing and into the path of a portion of said power piston at the rearward end of its stroke; an actuating plunger for said other of said switches; an expansible chamber having a movable wall; means connecting one end of said plunger to said movable wall; means forming a rigid chamber about said expansible chamber; and means connecting said rigid chamber with the hydraulic circuit of said hydro-pneumatic power mechanism whereby said other of said switches will be actuated by variations in pressure in said hydraulic circuit.

4. A pressure responsive switch assembly comprising in combination: a switch mounted in a housing; an expansible chamber attached to said housing and having a wall movable to and away from said switch in response to pressure variations affecting said chamber; an actuating plunger for said switch extending through a wall of said housing, said plunger having an enlarged portion intermediate its ends; means connecting one end of said plunger to said movable wall; oppositely facing surfaces on said housing cooperating with said enlarged portion of said plunger to limit its movement in both directions; and additional means resiliently urging said plunger away from said switch.

5. A pressure responsive switch assembly comprising in combination, a housing having a bore through one wall; a switch mounted in said housing; a sleeve in said bore having a partially threaded bore therein terminating at one end in a recess; an actuating plunger for said switch; means in said threaded bore slidably supporting said actuating plunger; a movable wall expansible chamber mounted on said sleeve and adapted for connection to a source of varying fluid pressure; means connecting said plunger with said wall for movement therewith; means for variably resisting the movement of said wall in response to said varying fluid pressure to effect controlled unitary movement of said wall, said connecting means and said plunger to actuate said switch; and means forming an enlarged section on said plunger adapted to be received in said recess to limit movement of said plunger toward said switch.

6. The assembly of claim 5 wherein said means for variably resisting movement of said wall comprises a spring compressed between said plunger supporting means and said enlarged section of said plunger to urge said plunger away from said switch to preload said expansible chamber.

7. A pressure responsive switch assembly comprising, a housing; a switch in said housing; a plunger for actuating said switch; an expansible chamber having a movable wall; means connecting said plunger to said movable wall; means connecting said chamber to a source of varying pressure to move said wall and said plunger to actuate said switch; means on said housing coacting directly with a portion of said plunger to limit the movement of said wall to a predetermined amount; and means coacting with said plunger to yieldingly urge said plunger and said wall in a direction away from said switch.

8. An electrical switch assembly comprising: a housing having an open face, a back wall for mounting a pair of electrical switches in said housing and having an opening therethrough to receive an actuating plunger for one of said switches, and an end wall having an opening therein in axial alignment with the actuating plunger of the other switch; a mounting sleeve secured in said end wall opening; a bellows and surrounding bellows housing mounted on the exposed end of said mounting sleeve; a movable plunger extending through said mounting sleeve and having one end connected to the movable wall of said bellows and its other end in abutting contact with the actuating plunger of said other switch; spring means acting on said movable plunger to resiliently urge said plunger and said bellows in a direction away from said other switch; a pipe coupler mounted on said surrounding bellows housing and communicating with the interior of said housing whereby the chamber formed between said bellows and said bellows housing may be connected to a source of fluid under pressure to subject the bellows to the pressure therein; and a cover plate for closing the open face of said housing.

9. The combination defined in claim 8 wherein said mounting sleeve at the end adjacent said other switch is provided with a plunger guide sleeve screw threadedly engaged with the bore of said mounting sleeve and said spring means comprises a coil spring surrounding said movable sleeve with one end abutting the inner end face of said guide sleeve and its other end abutting an enlargement on said movable plunger thereby providing a means for selectively preloading said spring to predetermine the force of said spring opposing said fluid pressure on said bellows.

10. The combination defined in claim 9 wherein the mounting sleeve is counterbored to a predetermined depth at its other end to receive the enlargement on said movable plunger and a cover plate is removably mounted on said other end of said mounting sleeve to cooperate with the bottom of said counterbore to limit movement of said movable plunger and bellows in both directions thereby relieving said bellows of injurious stresses from said spring force or said fluid pressure.

11. A bellows actuating assembly for an electric switch comprising a sleeve adapted for connection to a switch housing and having threaded through bore and a counter bore at one end; an externally threaded sleeve-like member threaded into the other end of said threaded through bore; a plunger having an enlargement thereon between its ends mounted in said sleeve with one end slidably received in the bore of said sleeve-like member, with said enlargement in said counterbore, and its other end extending substantially beyond said counterbored end of said sleeve; a closure cap secured to said one end of said sleeve to close said counterbore and having a through bore to receive said extending end of said plunger; an open ended bellows and surrounding bellows housing secured to each other at their open ends and to said cap in surrounded relation to said extending end of said plunger; means connecting said extending end of said plunger to the closed end of said bellows; and pipe coupling means communicating with the space between said bellows and bellows housing and adapted to connect said space to a source of fluid pressure effective upon variation of the pressure thereof to move said plunger back and forth in said sleeve.

12. The combination defined in claim 11 wherein the depth of said counterbore is predetermined whereby the bottom thereof and the opposed face of said cap cooperate respectively with said enlargement of said plunger to limit movement of said plunger and bellows in opposite directions.

13. The combination defined in claim 12 together with a coil spring surrounding said plunger adjacent said one end and acting between said sleeve-like member and said plunger enlargement to resiliently urge said plunger and bellows in a direction to engage said enlargement with said face of said cap.

14. A dual electrical switch assembly comprising, a hollow housing; a first switch mounted in said housing; actuating means for said switch extending through the wall of said housing adapted to be depressed by external actuating means; a second switch mounted in said housing, said second switch having an actuating pin; means forming an aperture in said housing substantially coaxial with said pin; a sleeve mounted in said aperture; a plunger received in said sleeve and having one end normally disposed closely adjacent said pin and its other end extending outwardly of said housing; an open ended bellows and surrounding bellows housing secured to each other; means securing said bellows and said bellows housing to said switch housing in surrounding relation to said other end of said plunger; means securing said other end of said plunger to the closed end of said bellows; and pipe coupling means communicating with the space between said bellows and said bellows housing and adapted to connect said space to a source of fluid under varying pressure effective to move said plunger back and forth in said sleeve to actuate said second switch.

15. A switch assembly as defined in claim 14 together with means forming an enlargement on said plunger and means cooperating with said enlargement for limiting movement of said plunger and said closed end of said bellows in both directions.

16. A switch assembly as defined in claim 14 together with means forming a restriction in said pipe coupling means to damp the variations in said fluid pressure source.

17. A pressure responsive actuating assembly unit for an electrical switch comprising in combination; a mounting sleeve having a stepped bore therein; a plunger in said bore having an end protruding beyond an end of said sleeve and adapted to actuate said switch; means in said bore slidably supporting said plunger; a movable wall expansible chamber mounted on said sleeve and adapted for connection to a source of varying fluid pressure; means connecting said plunger with said movable wall; variable means normally opposing movement of said wall in response to said varying fluid pressure with a predetermined force to effect controlled movement of said wall and said plunger in actuating said switch; and means forming an enlarged section on said plunger adapted to engage the shoulder of said stepped bore to limit movement of said plunger toward said switch.

18. A pressure responsive switch actuating assembly unit comprising in combination; a mounting sleeve having a stepped bore; a plunger having an enlarged portion intermediate its ends received in the enlarged portion of said stepped bore; a tension member adjustably extending into one end of said sleeve and having a through bore slidably receiving a projecting end of said plunger; a cap assembly mounted on the other end of said sleeve and fitting over the other projecting end of said plunger; resilient means cooperating with said tension member and said enlarged portion of said plunger for moving said plunger in one direction toward said cap assembly; means forming an expansible chamber in said cap assembly having a movable wall connected to said other projecting end of said plunger; and means adapted to connect said expansible chamber to a source of varying fluid pressure to move said plunger against the force of said resilient means.

19. An electrical control switch assembly for a solenoid valve operator comprising a switch housing; a mechanically operated switch and a pressure responsive switch in said housing; a first switch circuit, including said mechanically operated switch and first and second switch leads adapted for connection to said solenoid valve operator whereby said solenoid valve operator is energized in one position of said mechanical switch to move said solenoid valve operator to one operative position; a second circuit, including said pressure responsive switch and said first lead and a third lead adapted for connection to said solenoid valve operator whereby said solenoid valve operator is energized in one position of said pressure responsive switch to move said solenoid valve operator to a second operative position; and respective mechanical and pressure responsive means in said housing adapted for operation from external sources for alternately operating said mechanically operated switch and said pressure responsive switch to control said solenoid valve operator in desired sequence.

References Cited in the file of this patent

UNITED STATES PATENTS

| Number | Name | Date |
|---|---|---|
| 1,165,811 | Stafford | Dec. 28, 1915 |
| 1,230,049 | Stafford | June 12, 1917 |
| 1,712,882 | Gleason et al. | May 14, 1929 |
| 1,927,583 | Ernst | Sept. 19, 1933 |
| 1,938,762 | Haas | Dec. 12, 1933 |
| 2,084,562 | Schafer | June 22, 1937 |
| 2,161,150 | Flygare | June 6, 1939 |
| 2,169,470 | Miller et al. | Aug. 15, 1939 |
| 2,200,599 | Gaynor | May 14, 1940 |
| 2,219,896 | Harrington et al. | Oct. 29, 1940 |
| 2,376,475 | Bush | May 22, 1948 |
| 2,448,557 | Stephens | Sept. 7, 1948 |
| 2,471,838 | Ross | May 31, 1949 |
| 2,491,087 | Cardwell | Dec. 13, 1949 |
| 2,493,323 | Simson | Jan. 3, 1950 |
| 2,554,659 | Branson | May 29, 1951 |
| 2,595,967 | McCloy | May 6, 1952 |
| 2,655,573 | Szwargulski | Oct. 13, 1953 |